(12) United States Patent
Ku et al.

(10) Patent No.: US 8,314,574 B2
(45) Date of Patent: Nov. 20, 2012

(54) LIGHT EMITTING DIODE LAMP AND CONTROL CIRCUIT THEREOF

(75) Inventors: Chin-Long Ku, Taipei Hsien (TW); Huai-Qing Zheng, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 478 days.

(21) Appl. No.: 12/729,192

(22) Filed: Mar. 22, 2010

(65) Prior Publication Data

US 2011/0121739 A1 May 26, 2011

(30) Foreign Application Priority Data

Nov. 26, 2009 (CN) .......................... 2009 1 0310494

(51) Int. Cl.
*G05F 1/00* (2006.01)
(52) U.S. Cl. ........ 315/309; 315/307; 315/311; 315/247; 315/185 S; 315/312
(58) Field of Classification Search .............. 315/169.1, 315/185 S, 224, 247, 291, 297, 307–309, 315/311, 312
See application file for complete search history.

(56) References Cited

U.S. PATENT DOCUMENTS

| | | | | |
|---|---|---|---|---|
| 5,924,784 A | * | 7/1999 | Chliwnyj et al. | 362/234 |
| 6,111,739 A | * | 8/2000 | Wu et al. | 361/106 |
| 6,587,573 B1 | * | 7/2003 | Stam et al. | 382/104 |
| 7,777,430 B2 | * | 8/2010 | Catalano et al. | 315/309 |
| 2008/0055065 A1 | * | 3/2008 | Feldmeier | 340/458 |

* cited by examiner

*Primary Examiner* — Haiss Philogene
(74) *Attorney, Agent, or Firm* — Altis Law Group, Inc.

(57) ABSTRACT

A control circuit of an LED lamp includes a voltage regulator, at least a photo resistor and a feedback circuit. The voltage regulator includes an output terminal and a feedback terminal. The feedback circuit includes an amplifier having a first input end, a second input end and an output end. The LED lamp is connected between the first input end of the amplifier and the output terminal of the voltage regulator. The at least a photo resistor can sense a change of brightness level of an environment surrounding the LED lamp and a resistance of the at least a photo resistor increases along with a decrease of the brightness level. The change of resistance of the photo resistor is fed back to the voltage regulator via the amplifier, to thereby control an electric current flowing through the LED lamp.

7 Claims, 2 Drawing Sheets they shall be supplied with electrical current that will not adversely affect the operation of the LEDs 13 to drive the LEDs 13 to emit light is shown. The control circuit 20 includes a voltage regulator 21, two photo-resistors RF1, RF2 connected in parallel and a feedback circuit 25. The two photo-resistors RF1, RF2 are disposed at a top side of the lamp seat 11, far away from and opposite to the LEDs 13. When the LED lamp 10 is used, the photo-resistors RF1, RF2 can sense a brightness level of an environment surrounding the LED lamp 10. The photo-resistors RF1, RF2 have a characteristic that when the brightness level of the environment surrounding the LED lamp 10 has been reduced beyond a predetermined range, resistances thereof increase in a proportion to the decrease of the brightness level. The voltage regu-

LIGHT EMITTING DIODE LAMP AND CONTROL CIRCUIT THEREOF

BACKGROUND

1. Technical Field

The disclosure relates to light emitting diode lamps, and particularly to a control circuit for maintaining a luminous intensity of a light emitting diode lamp within an acceptable range.

2. Description of Related Art

Recently, light emitting diodes (LEDs) have become widely used in a variety of LED lamps, for example, miner's lamps, street lamps, submarine lamps and stage lamps, for their low power requirement and long lifetime.

The LED lamps may be used in an environment whose brightness level changes at different time periods, so that the LED lamp needs to output light with different light intensities to satisfy the lighting needs. If the brightness level of the environment surrounding the LED lamp is weaker, the luminous intensity of the LED lamp needs to be increased; otherwise the luminous intensity of the LED lamp needs to be decreased to save electric energy. However, the conventional LED lamp can only emit light with a constant luminous intensity, but can not spontaneously change intensity of light output in response to the brightness level of the environment surrounding the LED lamp.

It is thus desirable to provide an LED lamp with a control circuit which can overcome the described limitations.

DETAILED DESCRIPTION

Figure 1:
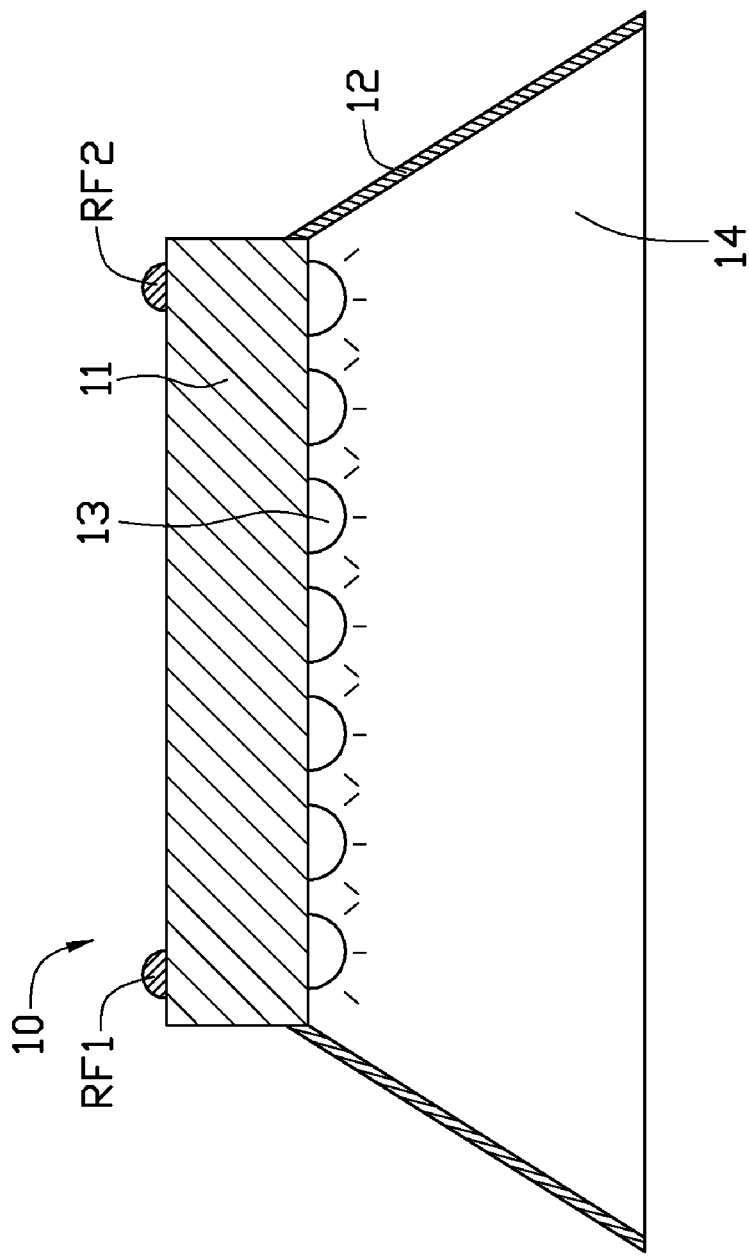
FIG. 1 is a schematic, cross-section view of a light emitting diode (LED) lamp according to an exemplary embodiment of the present invention.

Referring to FIG. 1, a light emitting diode (LED) lamp 10 according to an exemplary embodiment of the disclosure is shown. The LED lamp 10 includes a lamp seat 11, a plurality of LEDs 13 mounted on a bottom side of the lamp seat 11 and a lampshade 12 connected to a periphery of the lamp seat 11 and surrounding the LEDs 13. The lampshade 12 is hollow, conical frustum-shaped, and includes a first end (not labeled) connected to the periphery of the lamp seat 11 and an opposite second end (not labeled) far away from and below the lamp seat 11. The lampshade 12 defines a light exit 14 at the second end.

Figure 2:
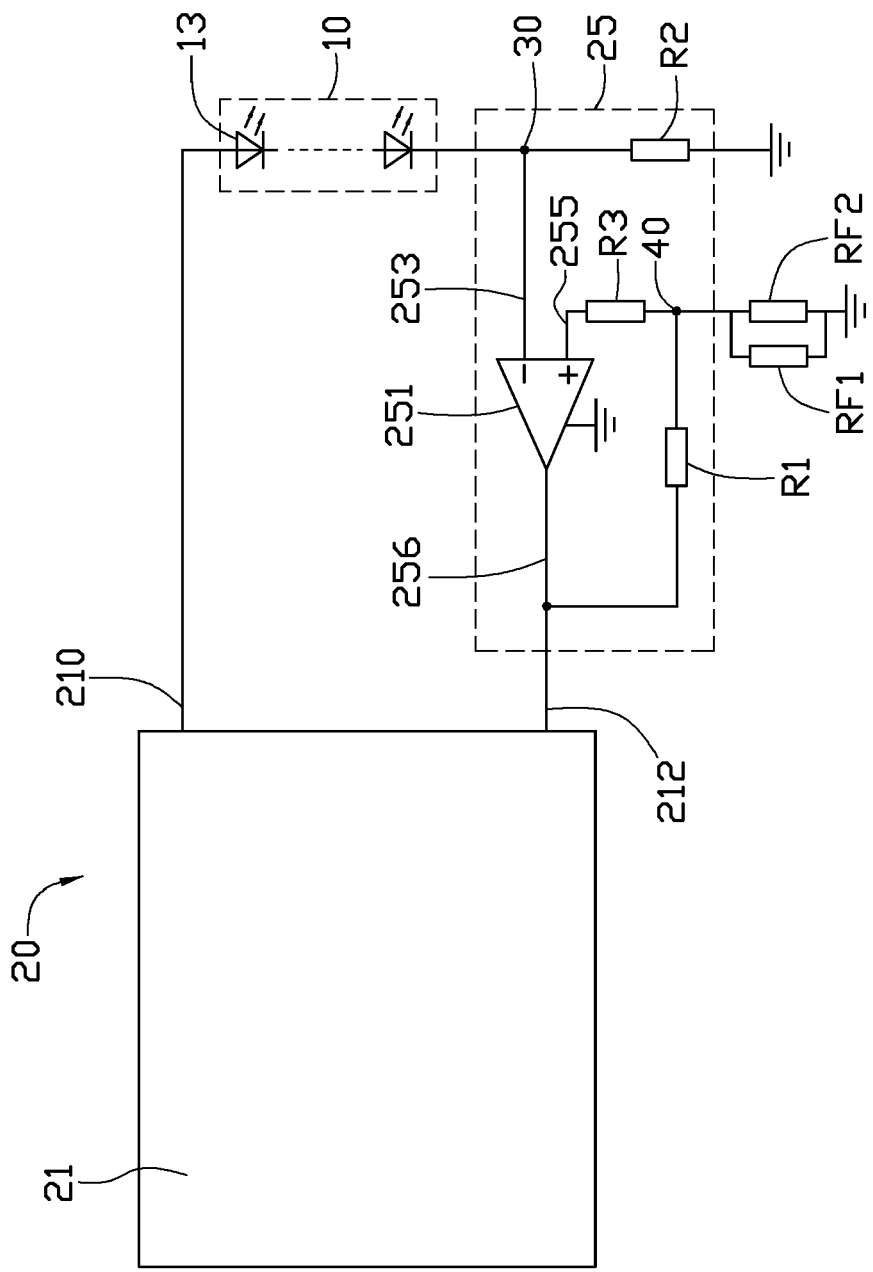
FIG. 2 is a schematic view of a control circuit of the LED lamp of FIG. 1.

Also referring to FIG. 2, a control circuit 20 for supplying an electric current to the LEDs 13 of the LED lamp 10 to drive the LEDs 13 to emit light is shown. The control circuit 20 includes a voltage regulator 21, two photo-resistors RF1, RF2 connected in parallel and a feedback circuit 25. The two photo-resistors RF1, RF2 are disposed at a top side of the lamp seat 11, far away from and opposite to the LEDs 13. When the LED lamp 10 is used, the photo-resistors RF1, RF2 can sense a brightness level of an environment surrounding the LED lamp 10. The photo-resistors RF1, RF2 have a characteristic that when the brightness level of the environment surrounding the LED lamp 10 has been reduced beyond a predetermined range, resistances thereof increase in a proportion to the decrease of the brightness level. The voltage regulator 21 includes an output terminal 210 for outputting the electric current to the LEDs 13 of the LED lamp 10 and a feedback terminal 212.

The feedback circuit 25 includes an amplifier 251, a first resistor R1, a second resistor R2 and a third resistor R3. The amplifier 251 includes an in-phase input end 255, an out-phase input end 253 and an output end 256. The LEDs 13 of the LED lamp 10 and the second resistor R2 are connected in series between the output terminal 210 of the voltage regulator 21 and the ground. A first junction 30 is formed between the LEDs 13 and the second resistor R2. That is, the LEDs 13 are connected between the output terminal 210 of the voltage regulator 21 and the first junction 30, whilst the second resistor R2 is connected between the first junction 30 and the ground. The out-phase input end 253 of the amplifier 251 is connected to the first junction 30. The first resistor R1 and the photo-resistors RF1, RF2 are connected in series between the output end 256 of the amplifier 251 and the ground. A second junction 40 is formed between the first resistor R1 and the photo-resistors RF1, RF2. The in-phase input end 255 of the amplifier 251 is connected to the second junction 40 via the third resistor R3. That is, the first resistor R1 and the third resistor R3 are connected in series between the output end 256 and the in-phase input end 255 of the amplifier 251, and the photo-resistors RF1, RF2 are connected between the second junction 40 and the ground. The output end 256 of the amplifier 251 is directly connected to the feedback terminal 212 of the voltage regulator 21.

Suppose that $I_F$ represents the electric current through the LEDs 13, and rF1, rF2 respectively represent the resistances of the photo-resistors RF1, RF2. The photo-resistors RF1, RF2 sense the brightness level of the environment surrounding the LED lamp 10 and the resistances rF1, rF2 of the photo-resistors RF1, RF2 increase along with a decrease of the brightness level of the environment surrounding of the LED lamp 10 when the brightness level has been reduced beyond a predetermined range. The increases of the resistances rF1, rF2 of the photo-resistors RF1, RF2 are fed back to the voltage regulator 21 via the amplifier 251, to thereby control the electric current $I_F$ flowing through the LEDs 13. Thus the electric current $I_F$ is increased to drive the LEDs 13 to emit more light, to thereby enhance the intensity of the light output of the LEDs 13, and the brightness level of the environment surrounding of the LED lamp 10 is accordingly increased.

When the brightness level of the environment surrounding the LED lamp 10 is increased beyond a predetermined range, the photo-resistors RF1, RF2 sense the brightness level the environment surrounding of the LED lamp 10 and the resistances rF1, rF2 of the photo-resistors RF1, RF2 decrease along with an increase of the brightness level. The decreases of the resistances rF1, rF2 of the photo-resistors RF1, RF2 are fed back to the voltage regulator 21 via the amplifier 251, to thereby control the electric current $I_F$ flowing through the LEDs 13. Thus the electric current $I_F$ is decreased to make the LEDs 13 emit less light, to thereby reduce the intensity of the light output of the LEDs 13. The consumed power of the LED lamp 10 is accordingly decreased to save electric energy.

When the luminous intensity of surroundings of the LED lamp 10 is nearly constant or maintains within the acceptable range, the resistances rF1, rF2 of the photo-resistors RF1, RF2 vary so little that they hardly affect the electric current $I_F$. At this moment, the intensity of the light output of the LED lamp 10 is constant.

It is to be understood, however, that even though numerous characteristics and advantages of the disclosure have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A control circuit adapted for controlling an electric current through an LED of an LED lamp, comprising:
   a voltage regulator comprising an output terminal for coupling to an input end of the LED thereby providing the electric current to the LED and a feedback terminal;
   a feedback circuit comprising an amplifier, the amplifier comprising an in-phase input end, an out-phase input end and an output end, the out-phase input end being adapted for coupling to an output end of the LED, the output end of the amplifier being connected to the feedback terminal of the voltage regulator; and
   at least a photo-resistor being connected between the in-phase input end of the amplifier and ground;
   wherein the at least a photo-resistor senses a change of a brightness level of an environment surrounding the LED lamp and has a resistance thereof increasing along with a decrease of the brightness level of the environment surrounding the LED lamp, the increase of resistance of the at least a photo-resistor being fed back to the voltage regulator via the amplifier, to thereby control the electric current to the LED to be increased so that an intensity of light output of the LED is increased.

2. The LED lamp control circuit as claimed in claim 1, wherein the feedback circuit further comprises a resistor being connected between the in-phase input end and the output end of the amplifier.

3. The LED lamp control circuit as claimed in claim 2, further comprising another resistor being connected between the out-phase input end and the ground.

4. An LED lamp comprising:
   a voltage regulator comprising an output terminal and a feedback terminal;
   an amplifier comprising an in-phase input end, an out-phase input end and an output end, the output end of the amplifier being connected to the feedback terminal of the voltage regulator;
   at least one LED being connected between the out-phase input end of the amplifier and the output terminal of the voltage regulator; and
   at least a photo-resistor being connected between the in-phase input end of the amplifier and ground;
   wherein the at least a photo-resistor senses a change of a brightness level of an environment surrounding the LED lamp and has a resistance thereof increasing along with a decrease of the brightness level of the environment surrounding the LED lamp, and the increase of resistance of the at least a photo-resistor is fed back to the voltage regulator via the amplifier, to thereby control an electric current flowing through the at least one LED to be increased to increase an intensity of light output of the at least one LED.

5. The LED lamp as claimed in claim 4, wherein the LED lamp further comprises a lamp seat, and the at least one LED is mounted on a side of the lamp seat, and the at least a photo-resistor mounted on another side of the lamp seat opposite to the at least one LED.

6. The LED lamp as claimed in claim 4, further comprising a resistor being connected between the in-phase input end and the output end of the amplifier.

7. The LED lamp as claimed in claim 6, further comprising another resistor being connected between the out-phase input end of the amplifier and the ground.

* * * * *